US011080183B2

(12) United States Patent
Huang et al.

(10) Patent No.: US 11,080,183 B2
(45) Date of Patent: Aug. 3, 2021

(54) MEMORY CHIP, MEMORY MODULE AND METHOD FOR PSEUDO-ACCESSING MEMORY BANK THEREOF

(71) Applicant: ELITE SEMICONDUCTOR MEMORY TECHNOLOGY INC., Hsinchu (TW)

(72) Inventors: Pei-Jey Huang, Hsinchu (TW); Tse-Hua Yao, Zhubei (TW)

(73) Assignee: ELITE SEMICONDUCTOR MEMORY TECHNOLOGY INC., Hsinchu (TW)

( * ) Notice: Subject to any disclaimer, the term of this patent is extended or adjusted under 35 U.S.C. 154(b) by 233 days.

(21) Appl. No.: 16/539,041

(22) Filed: Aug. 13, 2019

(65) Prior Publication Data
US 2021/0049095 A1 Feb. 18, 2021

(51) Int. Cl.
*G06F 12/06* (2006.01)
*G06F 12/10* (2016.01)

(52) U.S. Cl.
CPC .......... *G06F 12/0646* (2013.01); *G06F 12/10* (2013.01); *G06F 2212/657* (2013.01)

(58) Field of Classification Search
CPC . G06F 12/0646; G06F 12/10; G06F 2212/657
See application file for complete search history.

(56) References Cited

U.S. PATENT DOCUMENTS

| 6,275,894 | B1* | 8/2001 | Kuo | G11C 16/08 |
| | | | | 711/103 |
| 8,762,686 | B2* | 6/2014 | Sharma | G06F 12/0207 |
| | | | | 711/219 |
| 2002/0036937 | A1* | 3/2002 | Michinaka | G06T 1/60 |
| | | | | 365/200 |
| 2002/0194558 | A1* | 12/2002 | Wang | G11C 29/16 |
| | | | | 714/718 |
| 2004/0133730 | A1 | 7/2004 | Harrand et al. | |

FOREIGN PATENT DOCUMENTS

WO WO2006/021747 A1 3/2006

* cited by examiner

*Primary Examiner* — William E. Baughman
(74) *Attorney, Agent, or Firm* — Schmeiser, Olsen & Watts, LLP

(57) ABSTRACT

The present application proposes a memory chip includes a plurality of memory banks, a plurality of address pins, and a pseudo-address determining circuit. The plurality of address pins is arranged for receiving a plurality of address signals corresponding to the plurality of memory banks, respectively. The pseudo-address determining circuit has a plurality of input terminals coupled to the plurality of address pins, respectively, and a plurality of output terminals coupled to the plurality of memory banks. The pseudo-address determining circuit generates a pseudo-address table for the plurality of memory banks when the memory chip is powered-up. The pseudo-address table has a plurality of pseudo-addresses corresponding to the plurality of memory banks, respectively. The present application also provides a memory module that incorporates the memory chip and a method for pseudo-accessing memory banks of the memory chip.

12 Claims, 11 Drawing Sheets

|     | P1 | P2 | memory banks |
| --- | --- | --- | --- |
| S11 | 1 | 1 | 11 |
| S12 | 1 | 0 | 12 |
| S13 | 0 | 1 | 13 |
| S14 | 0 | 0 | 14 |

FIG.3

|     | P1 | P2 | memory banks |
|-----|----|----|--------------|
| S11 | 1  | 1  | 14           |
| S12 | 1  | 0  | 11           |
| S13 | 0  | 1  | 12           |
| S14 | 0  | 0  | 13           |

FIG.4

|  | P1 | P2 | memory banks |
|---|---|---|---|
| S11 | 1 | 1 | 13 |
| S12 | 1 | 0 | 11 |
| S13 | 0 | 1 | 12 |
| S14 | 0 | 0 | 14 |

FIG.5

| | P1 | P2 | memory banks |
|---|---|---|---|
| S11 | 1 | 1 | 13 |
| S12 | 1 | 0 | 14 |
| S13 | 0 | 1 | 12 |
| S14 | 0 | 0 | 11 |

MEMORY CHIP, MEMORY MODULE AND METHOD FOR PSEUDO-ACCESSING MEMORY BANK THEREOF

BACKGROUND OF THE INVENTION

1. Field of the Invention

The present invention relates to a memory chip and, more particularly, to a memory chip capable of pseudo-accessing its memory banks.

2. Description of Related Art

Random-access memory (RAM) is a form of computer data storage that stores data and machine code currently being used. A random-access memory device allows data items to be read or written in almost the same amount of time irrespective of the physical location of data inside the memory.

RAM contains multiplexing and de-multiplexing circuitry, to connect the data lines to the addressed storage for reading or writing the entry. Usually more than one bit of storage is accessed by the same address.

To be useful, memory cells must be readable and writeable. Within the RAM device, multiplexing and de-multiplexing circuitry is used to select memory cells. Typically, a RAM device has a set of address lines AO . . . An, and for each combination of bits that may be applied to these lines, a set of memory cells are activated. Due to this addressing, RAM devices virtually always have a memory capacity that is a power of two.

Many RAM systems have a memory hierarchy consisting of cell, bank, rank, module, and channel. Please refer to FIG. 1, which illustrating a block diagram of a hierarchy of a RAM system. A CPU 1 is coupled to one or more memory channels 2a-2b. Each of the memory channels 2a-2b may include several memory modules 3. Each memory module 3 may have one or two memory ranks 4 which includes several memory chips 5. Each memory chip 5 includes several memory banks 6. Each memory bank 6 is formed by many memory cell 7 arranged in an array.

BRIEF SUMMARY OF THE INVENTION

It is customary for a memory device manufacturer to warrant its product to have a life span of certain years or even a lifetime. The number of years of the warranty is usually estimated under a conception that the number of total access operations can be performed on the memory device is evenly distributed among all memory banks of the memory device. In some cases of over-simplified implementations, the memory requirement of the application is very low (much smaller than the system equipped) but very frequent, the application may tend to access some certain memory banks much more frequently than other memory banks. Eventually, it will lead to early decaying of the memory banks that are heavy-accessed.

It is therefore an object of the present invention to provide a memory chip capable of pseudo-accessing its memory banks in order to prevent early decaying of the memory banks.

To achieve the above object, according to one aspect of the present invention, a memory chip is proposed. The memory chip includes a plurality of memory banks, a plurality of address pins, and a pseudo-address determining circuit. The plurality of address pins is arranged for receiving a plurality of address signals corresponding to the plurality of memory banks, respectively. The pseudo-address determining circuit has a plurality of input terminals coupled to the plurality of address pins, respectively, and a plurality of output terminals coupled to the plurality of memory banks. The pseudo-address determining circuit generates a pseudo-address table for the plurality of memory banks when the memory chip is powered-up. The pseudo-address table has a plurality of pseudo-addresses corresponding to the plurality of memory banks, respectively, and each of the plurality of memory banks is arranged to be accessed according to the corresponding pseudo-address.

To achieve the above object, according to another aspect of the present invention, a memory module is proposed. The memory module includes: a printed circuit board; a control circuit disposed on the printed circuit board; and a plurality of memory chips disposed on the printed circuit board and coupled to the control circuit, wherein each of the memory chips comprises: a plurality of memory banks; a plurality of address pins arranged for receiving a plurality of address signals corresponding to the plurality of memory banks, respectively; and a pseudo-address determining circuit having a plurality of input terminals and a plurality of output terminals, wherein the plurality of input terminals are coupled to the plurality of address pins, respectively, the plurality of output terminals are coupled to the plurality of memory banks, and the pseudo-address determining circuit generates a pseudo-address table for the plurality of memory banks when the memory chip is powered-up, wherein the pseudo-address table has a plurality of pseudo-addresses corresponding to the plurality of memory banks, respectively, and each of the plurality of memory banks is arranged to be accessed according to the corresponding pseudo-address.

To achieve the above object, according to yet another aspect of the present invention, a method for pseudo-accessing memory banks of a memory chip is proposed. The method includes steps: generating a pseudo-address table for memory banks when the memory chip is powered-up, wherein the pseudo-address table is stored in a memory, and each of the plurality of memory banks corresponds to a pseudo-address in the pseudo-address table; receiving a control signal with an address signal indicating an intended memory bank that the control signal is about to be sent to; determining a pseudo-address according to the address signal indicating an intended memory bank and the pseudo-address table; and redirecting the control signal to a pseudo memory bank indicated by the pseudo-address.

With these arrangements, the memory chip, memory module and method for pseudo-accessing memory banks of a memory chip can change pseudo-address table of memory banks each time the memory chip is powered-up. In this way, the frequency of accessing each memory bank will be averagely distributed among all memory banks regardless the design or implementation of the application. In other word, the present invention can prevent early decaying from memory banks due to heavily accessing.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 3 is an address table of a memory chip according to an embodiment of the present invention.

FIG. 5 is a pseudo-address table for a memory chip according to different embodiments of the present invention.

FIG. 4 is a pseudo-address table for a memory chip according to different embodiments of the present invention.

DETAILED DESCRIPTION OF THE INVENTION

The present invention will now be described with some preferred embodiments thereof and by referring to the accompanying drawings.

Figure 1:
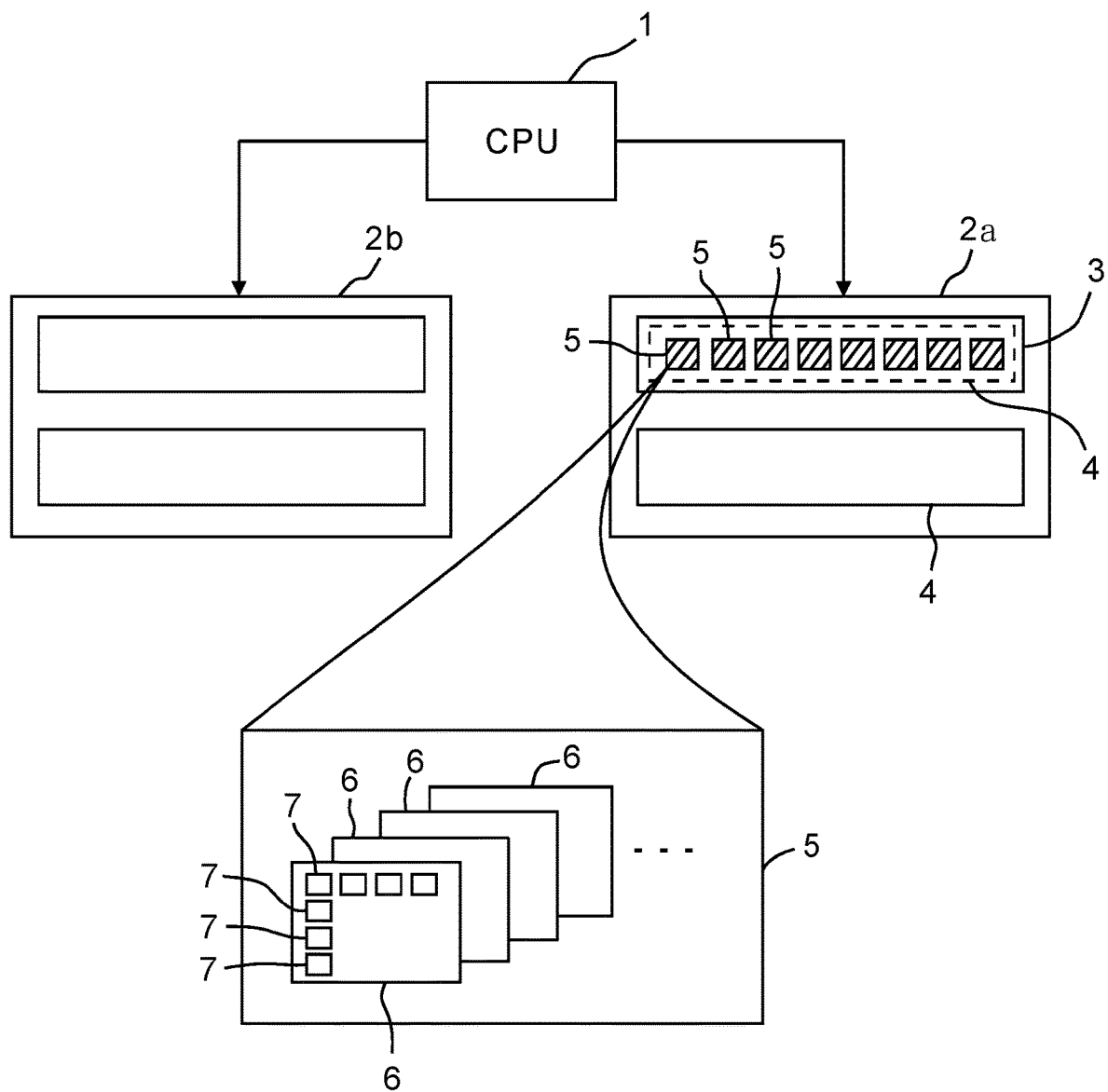
FIG. 1 is a block diagram of a hierarchy of a traditional RAM system.
Figure 2:
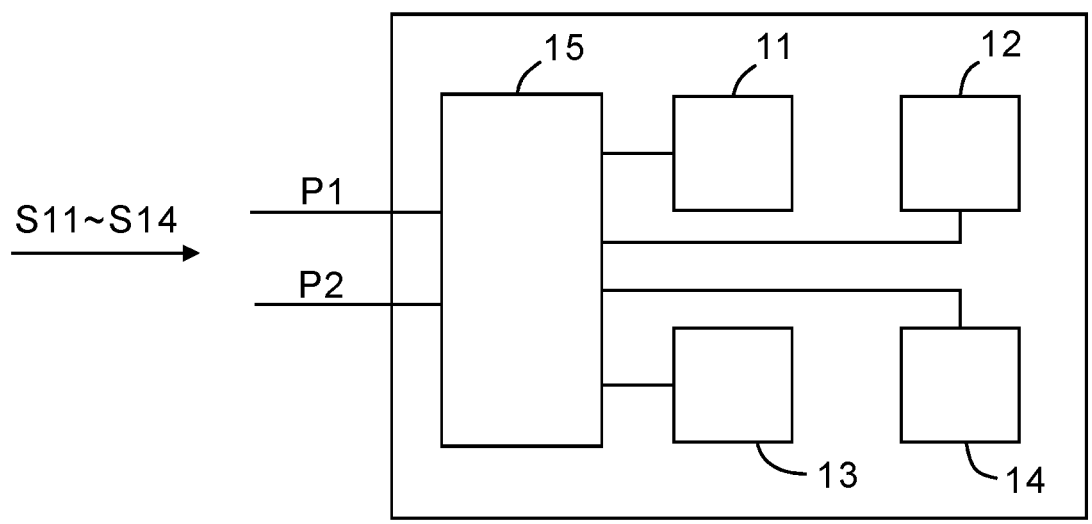
FIG. 2 is a block diagram of a memory chip according to an embodiment of the present invention.

Please refer to FIG. 2 which illustrating a block diagram of a memory chip according to an embodiment of the present invention. In FIG. 2, the memory chip 10 includes a plurality of memory banks 11~14, a plurality of address pins P1~P2, and a pseudo-address determining circuit 15.

The address pins P1~P2 is arranged for receiving address signals S11~S14 which corresponds to the plurality of memory banks 11~14, respectively. That is to say, the address signals S11~S14 will constitute the 4 possible outcomes of the voltage level of the address pins P1~P2. Please refer to FIG. 3, which is an address table of the memory chip 10 according to an embodiment of the present invention. In FIG. 3, the address signal S11 causes voltage levels of both address pins P1 and P2 at relative high (denoted by the number "1"), the address signal S12 causes the voltage level of address pin P1 at relative high while the voltage level of the address pin P2 at relative low (denoted by the number "0"), the address signal S13 causes the voltage level of address pin P1 at relative low while the voltage level of the address pin P2 at relative high, and the address signal S14 causes voltage levels of both address pins P1 and P2 to relative low. In the embodiment, if an address signal is received and results both address pins P1~P2 at relative high voltage levels, the address signal S11 is received. The memory chip 10 will then determines that the memory bank 11 is a target memory bank for the operation to come. In the previous embodiment, it is also helpful to views the address pin P1 is a row address and the address pin P2 is a column address pin. In other words, the address pin P1 is arranged to receive a voltage level that determines which row of the array of the memory banks 11~14 is the target memory bank located on, and the address pin P2 is arranged to receive a voltage level that determines which column of the array of the memory banks 11~14 is the target memory bank located on. Please note that, the number of address pins in this embodiment is for illustrative purpose only, and not meant to be a limitation of the present invention. Those skilled in the art can make modifications and alternations depending on actual design and requirements of the application without departing from spirit of the present invention.

Please refer back to FIG. 2, in FIG. 2, the pseudo-address determining circuit 15 has a plurality of input terminals and a plurality of output terminals. The input terminals of the pseudo-address determining circuit 15 are coupled to address pins P1~P2, respectively. The output terminals of pseudo-address determining circuit 15 are coupled to memory banks 11~14. In an alternative design, the output terminals of pseudo-address determining circuit 15 may be coupled to memory banks 11~14 via a row address controller and a column address controller. In this fashion, the output terminal coupled to the row address controller will send a row select signal to the row address controller to determine which row of the array of the memory banks 11~14 is the target memory bank located on, and the output terminal coupled to the column address controller will send a column select signal to the column address controller to determines which column of the array of the memory banks 11~14 is the target memory bank located on. In either of the above designs, the signals outputted from the output terminals of the pseudo-address determining circuit 15 will determine the address of the memory bank that is going to carry out the operation to come.

In addition, the pseudo-address determining circuit 15 will generate a pseudo-address table for memory banks 11~14 each time when the memory chip 10 is powered-up. The pseudo-address table can then be stored and looked up in a register. For example, please refer to FIG. 3, FIGS. 4 and 5 concurrently. FIGS. 4 and 5 illustrate pseudo-address tables for memory chip 10 according to different embodiments of the present invention. In the pseudo-address table of FIG. 4, are the pseudo-address table is generated such that the memory banks 11~14 correspond to the address signals S11~S14 differently with regard to the address table of FIG. 3 by shifting the column addresses that indicate memory banks 11~14. In FIG. 4, the address signal S11 now corresponds to memory bank 12, the address signal S12 now corresponds to memory bank 13, the address signal S13 now corresponds to memory bank 14, and the address signal S14 now corresponds to memory bank 11. To be precisely speaking, the corresponding positions of the memory banks 11~14 in FIG. 4 is the corresponding positions of the memory banks 11~14 in FIG. 3 "circularly shift" one step downward. In other words, in the embodiment of FIG. 4, the memory bank 12 can only be accessed according to the address signal S13. When a developer intends to access the memory bank 13, he will instead "pseudo-access" the memory bank 12. In an application that the memory bank 13 is heavily over-accessed, the above pseudo-address table generated by the pseudo-address determining circuit 15 will secretly shift some of the operational burden of the memory bank 13 to the memory bank 12 without any further configuration such that it can prevent the memory bank 13 from early decaying. Each time when the memory chip 10 is powered-up, the pseudo-address determining circuit 15 generates a new pseudo-address table. This will make the loading of the supposedly heavy-accessed memory bank 13 be distributed to another memory bank.

In FIG. 5, the pseudo-address table is generated by the pseudo-address determining circuit 15 randomly. For example, the pseudo-address table is generated by duplicating the address table and then replacing the column addresses of the duplicated address table that indicate memory banks 11~14 with a randomly-ordered column addresses of memory banks 11~14. Statistically, the reliability of the memory chip 10 will be increased if the pseudo-address is generated randomly when iterations of the pseudo-address grows.

Figure 6:
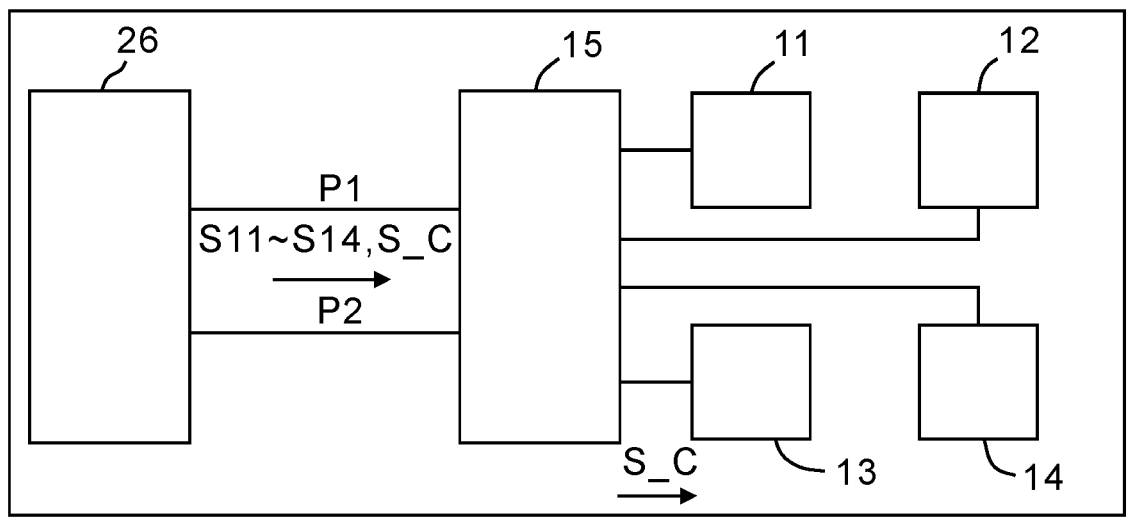
FIG. 6 is a block diagram of a memory chip and an exemplary pseudo-address table according to another embodiment of the present invention.

Please refer to FIG. 6, which illustrating a block diagram of a memory chip and an exemplary pseudo-address table according to another embodiment of the present invention. Please note that, memory chip 20 shares some components with the memory chip 10. If a component in memory chip 20 is substantially the same with those in memory chip 10, it will be denoted with the same notation to avoid confusion. In FIG. 6, the memory chip 20 further includes a controller 26. The controller 26 is coupled to the pseudo-address determining circuit 15 and arranged for issuing a control signal S_C with an address signal indicating an intended memory bank that the control signal S_C is about to be sent to. For example, the controller 26 is about to write data to the memory bank 11. The controller 26 issues the control signal S_C that indicating a write operation and the address signal S11 that indicating the target memory bank is memory bank 11. In the embodiment, the pseudo-address determining circuit 15 then determines a pseudo-address of the memory bank 11 according to the address signal S11 and the pseudo-address table of FIG. 6, i.e., the memory bank 13. The pseudo-address determining circuit 15 then redirects the control signal S_C to the memory bank 13.

Figure 7:
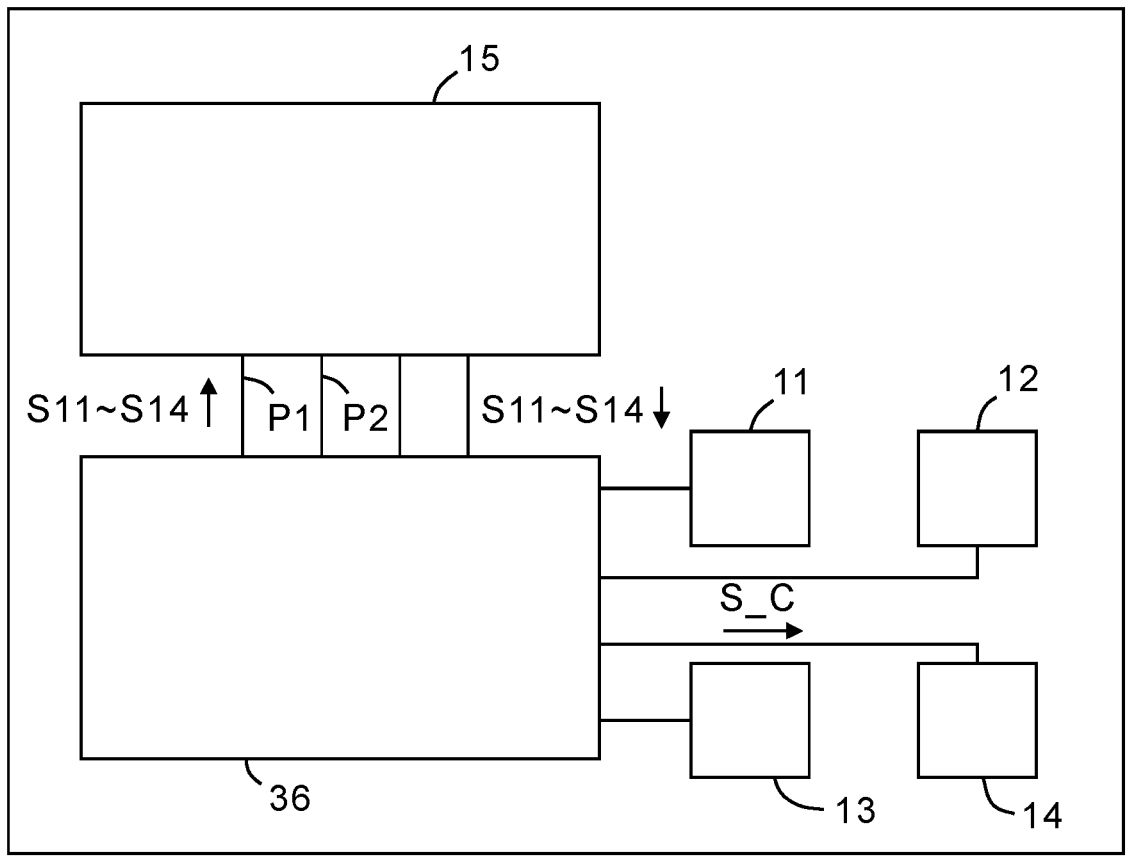
FIG. 7 is a block diagram of a memory chip and an exemplary pseudo-address table according to yet another embodiment of the present invention.

Please refer to FIG. 7, which illustrating a block diagram of a memory chip and an exemplary pseudo-address table according to yet another embodiment of the present invention. Please note that, memory chip 30 shares some components with the memory chip 10 and memory chip 20. If a component in memory chip 30 is substantially the same with those in memory chip 10 and memory chip 20, it will be denoted with the same notation to avoid confusion. In FIG. 7, the memory chip 30 further includes a controller 36. The controller 36 is coupled to the pseudo-address determining circuit 15 and the memory banks 11~14. The controller 36 is arranged for issuing a control signal S_C with an address signal indicating an intended memory bank that the control signal S_C is about to be sent to. In the embodiment, the address signal indicating the intended memory bank is sent to the pseudo-address determining circuit 15. The pseudo-address determining circuit 15 determines a pseudo-address according to the received address signal and the pseudo-address table, and sends the address signal corresponding to the pseudo-address back to the controller 36. The controller 36 then redirects the control signal S_C to a pseudo memory bank indicated by the pseudo-address. For example, the controller 26 is about to write data to the memory bank 11. The controller 36 issues the control signal S_C that indicating a write operation and the address signal S11 that indicating the target memory bank is memory bank 11. In the embodiment, the pseudo-address determining circuit 15 then determines a pseudo-address of the memory bank 11 according to the address signal S11 and the pseudo-address table of FIG. 7, i.e., the memory bank 14. The pseudo-address determining circuit 15 then sends back the address signal S14 back to the controller 36. The controller 36 then redirects the control signal S_C to the memory bank 14.

Figure 8:
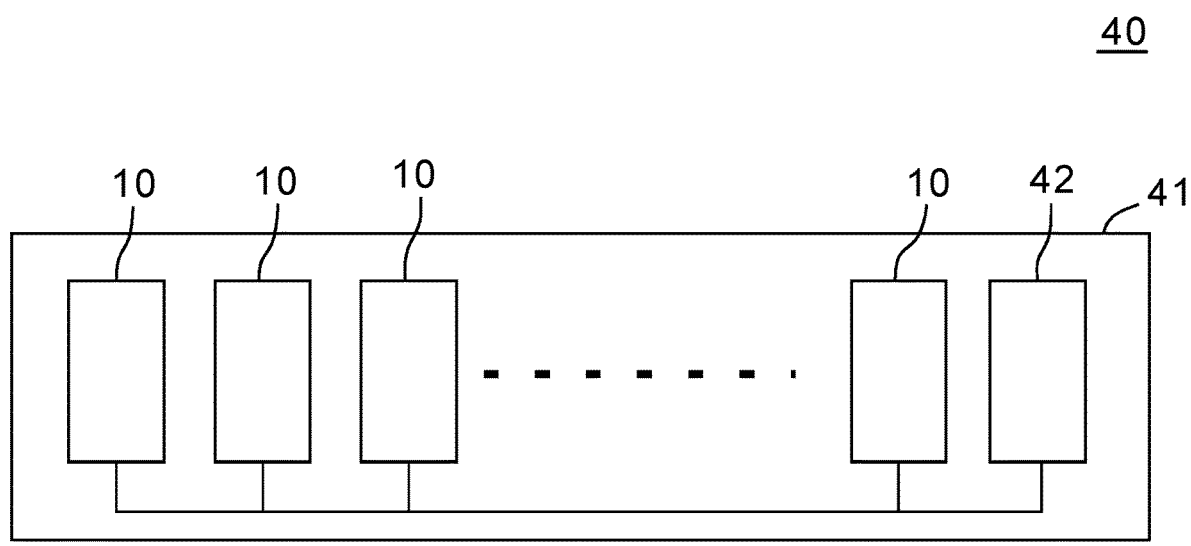
FIG. 8 is a memory module according to different embodiments of the present invention.

The above-mentioned memory chips 10, 20 and 30 can further be incorporated into a memory module. Please refer to FIG. 8, which illustrating a memory module according to an embodiment of the present invention. In FIG. 8, the memory module 40 includes a printed circuit board 41, a control circuit 42 and a plurality of memory chips 10. The control circuit 42 is disposed on the printed circuit board 41 and arranged for selecting a target memory chip 10. The memory chips 10 are disposed on the printed circuit board 41 and coupled to the control circuit 42. The constructions and operations of the memory chips 10 can be referred to the above paragraphs. Detailed descriptions will be omitted here for brevity.

Figure 9:
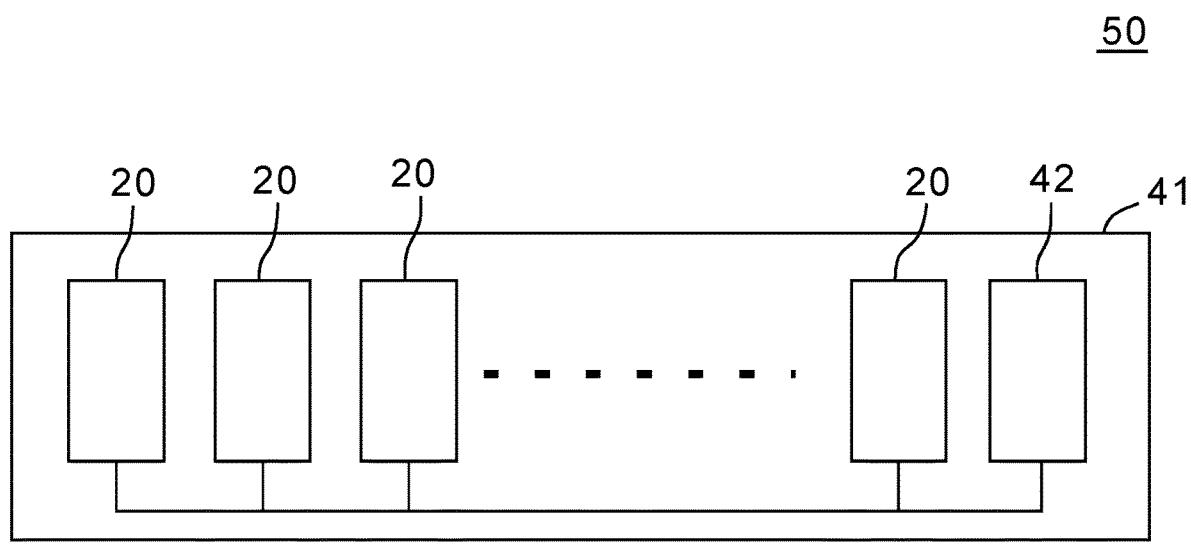
FIG. 9 is a memory module according to different embodiments of the present invention.

Please refer to FIG. 9, which illustrating a memory module according to an embodiment of the present invention. Please note that, memory module 50 shares some components with the memory module 40. If a component in memory module 40 is substantially the same with those in memory module 50, it will be denoted with the same notation to avoid confusion. In FIG. 9, the memory module 50 includes a printed circuit board 41, a control circuit 42 and a plurality of memory chips 20. The constructions and operations of the memory chips 20 can be referred to the above paragraphs. Detailed descriptions will be omitted here for brevity.

Figure 10:
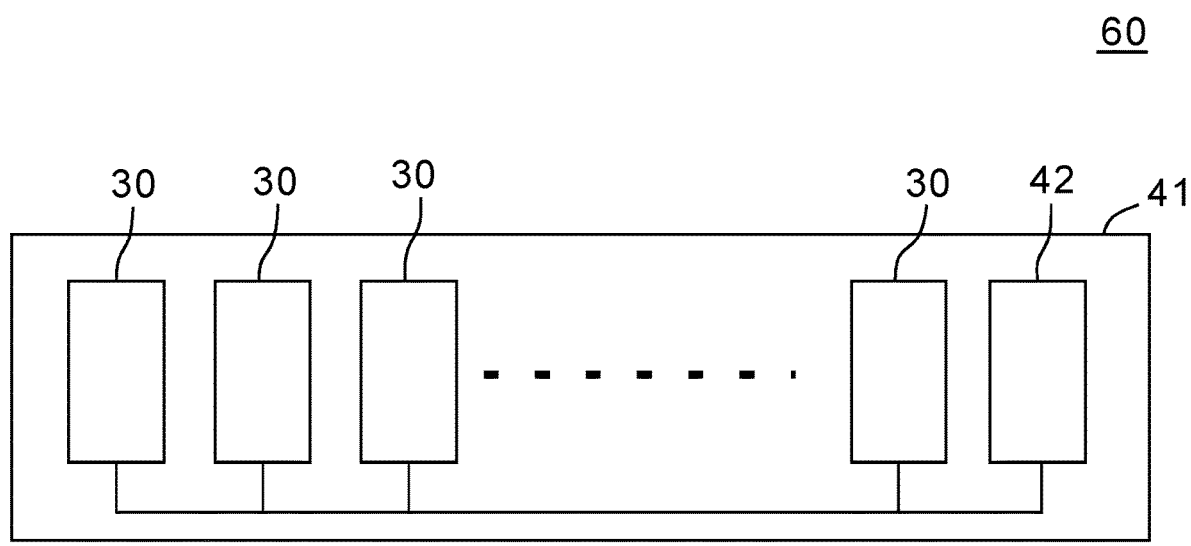
FIG. 10 is a memory module according to different embodiments of the present invention.

Please refer to FIG. 10, which illustrating a memory module according to an embodiment of the present invention. Please note that, memory module 60 shares some components with the memory module 40 and memory module 50. If a component in memory module 60 is substantially the same with those in memory module 40 and memory module 50, it will be denoted with the same notation to avoid confusion. In FIG. 10, the memory module 60 includes a printed circuit board 41, a control circuit 42 and a plurality of memory chips 30. The constructions and operations of the memory chips 30 can be referred to the above paragraphs. Detailed descriptions will be omitted here for brevity.

The pseudo-address determining circuit 15 can also be disabled with a test-mode enable signal. When testing the reliability of the memory chip 10, it is crucial for the tester to actually test the target memory bank without it being pseudo-accessed. Using the test-mode enable signal to disable the pseudo-address determining circuit 15 will provide flexibility of the applications of the memory chip 10, 20, or 30.

Figure 11:
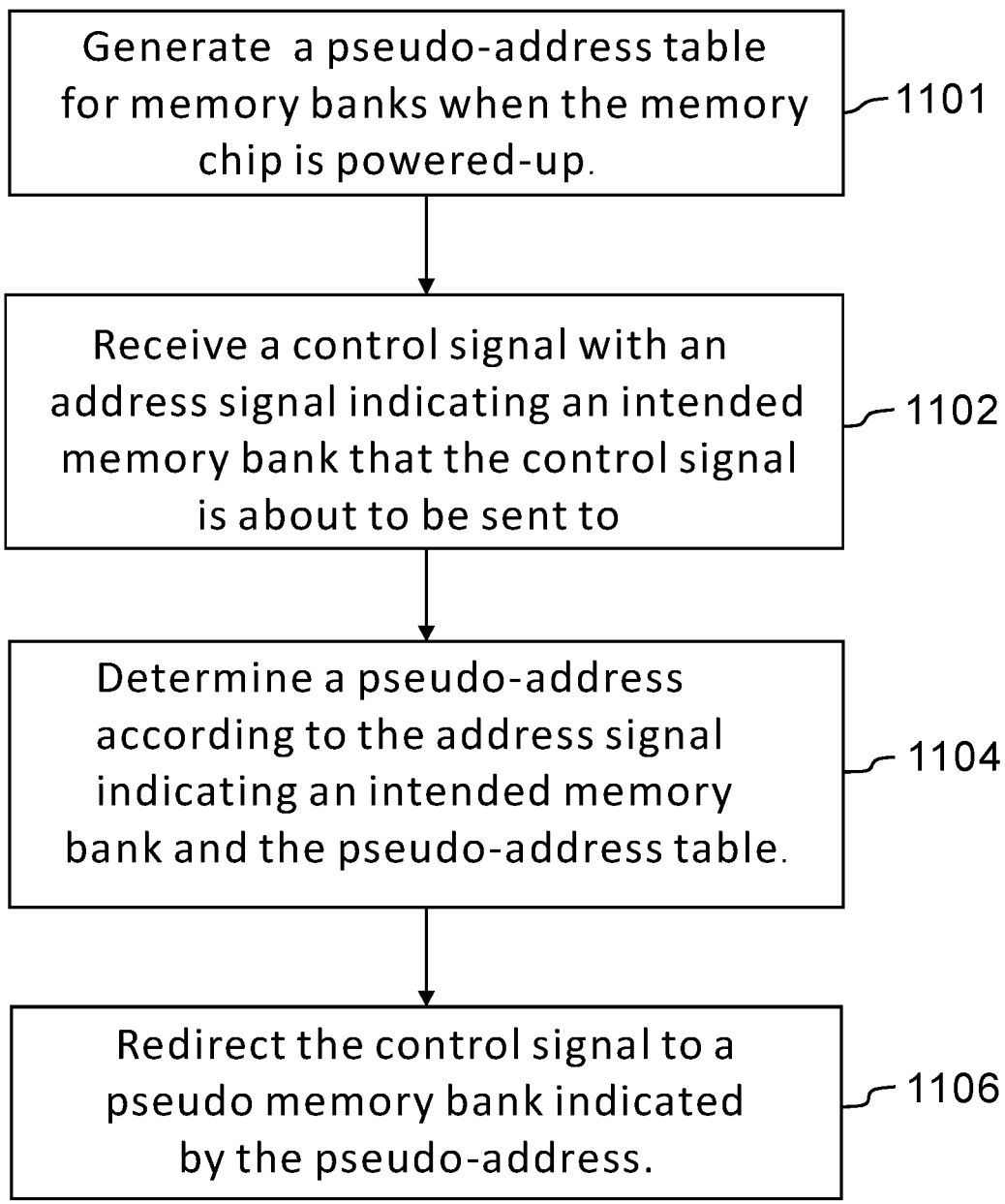
FIG. 11 is a flowchart of a method for pseudo-accessing memory banks of a memory chip according to an exemplary embodiment of the present invention.

Please refer to FIG. 11, which is a flowchart of a method for pseudo-accessing memory banks of a memory chip according to an exemplary embodiment of the present invention. Provided that the result is substantially the same, the steps are not required to be executed in the exact order shown in FIG. 11. The exemplary method may be employed by the memory chip 10 shown in FIG. 2, the memory chip 20 shown in FIG. 6, the memory chip 30 shown in FIG. 7, the memory module 40 in FIG. 8, the memory module 50 in FIG. 9, and the memory module 60 in FIG. 10, and may be summarized as below.

Step 1101: Generate a pseudo-address table for memory banks when the memory chip is powered-up.

Step 1102: Receive a control signal with an address signal indicating an intended memory bank that the control signal is about to be sent to.

Step 1104: Determine a pseudo-address according to the address signal indicating an intended memory bank and the pseudo-address table.

Step 1106: Redirect the control signal to a pseudo memory bank indicated by the pseudo-address.

In the method 1100, the pseudo-address table is stored in a memory, and each of the plurality of memory banks corresponds to a pseudo-address in the pseudo-address table. The step 1101 can be performed by the pseudo-address determining circuit 15 of memory chip 10, 20, or 30. The step 1102 can be performed by pseudo-address determining circuit 15. The address signal is issued by the controller 26, or 36. The step 1104 can be performed by the pseudo-address determining circuit 15 of memory chip 10, 20, or 30. The step 1106 can be performed by the pseudo-address determining circuit 15, or the controller 26, or 36.

The present invention has been described with some preferred embodiments thereof and it is understood that the preferred embodiments are only illustrative and not intended to limit the present invention in any way and many changes and modifications in the described embodiments can be carried out without departing from the scope and the spirit of the invention that is intended to be limited only by the appended claims.

What is claimed is:

1. A memory chip, comprising:
   a plurality of memory banks;
   a plurality of address pins arranged for receiving a plurality of address signals corresponding to the plurality of memory banks, respectively; and
   a pseudo-address determining circuit having a plurality of input terminals and a plurality of output terminals, wherein the plurality of input terminals are coupled to the plurality of address pins, respectively, the plurality of output terminals are coupled to the plurality of memory banks, and the pseudo-address determining circuit generates a pseudo-address table for the plurality of memory banks when the memory chip is powered-up,
   wherein the pseudo-address table has a plurality of pseudo-addresses corresponding to the plurality of memory banks, respectively, and each of the plurality of memory banks is arranged to be accessed according to the corresponding pseudo-address.

2. The memory chip of claim 1, wherein the pseudo-address determining circuit randomly generates the pseudo-address table for the plurality of memory banks.

3. The memory chip of claim 2, further comprising:
   a controller coupled to the pseudo-address determining circuit and arranged for issuing a control signal with the address signal indicating an intended memory bank that the control signal is about to be sent to,
   wherein the pseudo-address determining circuit determines the pseudo-address according to the address signal indicating the intended memory bank and the pseudo-address table, and the pseudo-address determining circuit redirects the control signal to a pseudo memory bank indicated by the pseudo-address.

4. The memory chip of claim 2, further comprising:
   a controller coupled to the pseudo-address determining circuit and arranged for issuing a control signal with the address signal indicating an intended memory bank that the control signal is about to be sent to,
   wherein the pseudo-address determining circuit determines the pseudo-address according to the address signal indicating the intended memory bank and the pseudo-address table, and the controller redirects the control signal to a pseudo memory bank indicated by the pseudo-address.

5. The memory chip of claim 1, wherein the pseudo-address determining circuit is disabled in response to a test-mode enable signal.

6. A memory module, comprising:
   a printed circuit board;
   a control circuit disposed on the printed circuit board; and
   a plurality of memory chips disposed on the printed circuit board and coupled to the control circuit, wherein each of the memory chips comprises:
   a plurality of memory banks;
   a plurality of address pins arranged for receiving a plurality of address signals corresponding to the plurality of memory banks, respectively; and
   a pseudo-address determining circuit having a plurality of input terminals and a plurality of output terminals, wherein the plurality of input terminals are coupled to the plurality of address pins, respectively, the plurality of output terminals are coupled to the plurality of memory banks, and the pseudo-address determining circuit generates a pseudo-address table for the plurality of memory banks when the memory chip is powered-up,
   wherein the pseudo-address table has a plurality of pseudo-addresses corresponding to the plurality of memory banks, respectively, and each of the plurality of memory banks is arranged to be accessed according to the corresponding pseudo-address.

7. The memory module of claim 6, wherein the pseudo-address determining circuit randomly generates the pseudo-address table for the plurality of memory banks.

8. The memory module of claim 7, wherein each of the memory chips further comprises:
   a controller coupled to the pseudo-address determining circuit and arranged for issuing a control signal with the address signal indicating an intended memory bank that the control signal is about to be sent to,
   wherein the pseudo-address determining circuit determines the pseudo-address according to the address signal indicating the intended memory bank and the pseudo-address table, and the pseudo-address determining circuit redirects the control signal to a pseudo memory bank indicated by the pseudo-address.

9. The memory module of claim 7, wherein each of the memory chips further comprises:
   a controller coupled to the pseudo-address determining circuit and arranged for issuing a control signal with the address signal indicating an intended memory bank that the control signal is about to be sent to,
   wherein the pseudo-address determining circuit determines the pseudo-address according to the address signal indicating the intended memory bank and the pseudo-address table, and the controller redirects the control signal to a pseudo memory bank indicated by the pseudo-address.

10. The memory module of claim 6, wherein the pseudo-address determining circuit is disabled in response to a test-mode enable signal.

11. A method for pseudo-accessing memory banks of a memory chip, comprising:
    generating a pseudo-address table for memory banks when the memory chip is powered-up, wherein the pseudo-address table is stored in a memory, and each of the plurality of memory banks corresponds to a pseudo-address in the pseudo-address table;
    receiving a control signal with an address signal indicating an intended memory bank that the control signal is about to be sent to;
    determining a pseudo-address according to the address signal indicating an intended memory bank and the pseudo-address table; and
    redirecting the control signal to a pseudo memory bank indicated by the pseudo-address.

12. The method of claim 11, wherein the step of generating the pseudo-address table for memory banks is performed by randomly generating the pseudo-address table for memory banks.

* * * * *